(12) United States Patent
Muller

(10) Patent No.: US 6,554,126 B1
(45) Date of Patent: Apr. 29, 2003

(54) METHOD FOR CONVEYING UNIT LOADS AND CONVEYOR SYSTEM FOR IMPLEMENTING SAID METHOD

(75) Inventor: Beat Muller, Ottoberg (CH)

(73) Assignee: IPT Weinfelden AG, Weinfelden (CH)

(*) Notice: Subject to any disclaimer, the term of this patent is extended or adjusted under 35 U.S.C. 154(b) by 0 days.

(21) Appl. No.: 09/937,073
(22) PCT Filed: Mar. 20, 2000
(86) PCT No.: PCT/CH00/00157
§ 371 (c)(1),
(2), (4) Date: Apr. 1, 2002
(87) PCT Pub. No.: WO00/56639
PCT Pub. Date: Sep. 28, 2000

(30) Foreign Application Priority Data

Mar. 24, 1999 (CH) ................................. 557/99

(51) Int. Cl.[7] .............................................. B65G 29/00
(52) U.S. Cl. ................. 198/465.1; 198/468.2; 198/418.7
(58) Field of Search .......................... 198/418.7, 419.1, 198/419.3, 431, 432, 433, 465.1, 476.1, 478.1, 468.2

(56) References Cited

U.S. PATENT DOCUMENTS

| | | |
|---|---|---|
| 2,424,055 A | 7/1947 | Rousseau |
| 4,558,830 A | 12/1985 | Larsson |
| 4,834,232 A * | 5/1989 | Freermann ............... 198/468.2 |
| 5,074,678 A | 12/1991 | Eberle |
| 5,176,245 A * | 1/1993 | Sekitani ................... 198/465.2 |
| 5,304,027 A | 4/1994 | La Barre et al. |
| 5,351,804 A * | 10/1994 | Haberstroh .............. 198/478.1 |
| 6,141,943 A * | 11/2000 | Hart et al. ............... 198/418.6 |

FOREIGN PATENT DOCUMENTS

| | | |
|---|---|---|
| DE | 197 17 351 A1 | 10/1997 |
| EP | 0 107 533 A | 5/1984 |
| EP | 0 870 934 A1 | 3/1998 |
| FR | 453 962 A | 6/1913 |

OTHER PUBLICATIONS

WO 98/23509, Means for Guiding the Rolling or Gliding Movement of Objects Along a Given Path, Jun. 4, 1998.

* cited by examiner

Primary Examiner—Christopher P. Ellis
Assistant Examiner—Gene O Crawford
(74) Attorney, Agent, or Firm—Rankin, Hill, Porter & Clark LLP

(57) ABSTRACT

In a conveying system with rail-like guide means (2) and conveying means (1) movable along the guide means (2) independently of one another, a displaceable rail element (5.1–5.4) is provided for a changeover from serial to parallel conveyance. The displaceable rail element (5.1–5.4) connects in a first position with an essentially stationary rail element (3). In this first position it is filled with conveying means (1) being supplied in series along the stationary rail element (3). The conveying means (1) are then blocked on the displaceable rail element (5.1–5.4) and the displaceable rail element (5.1–5.4) is displaced in essence transverse to its length, thereby conveying the conveying means in parallel. For a changeover from parallel to serial conveyance, the displaceable rail element (5.1–5.4) is brought into a second position once again transverse to its own length, in which second position it again connects with an essentially stationary rail element (4, 4') and the conveying means (1) are unblocked and conveyed away in series from the displaceable rail element (5.1–5.4) along the stationary rail element (4, 4'). Advantageously, a plurality of displaceable rail elements (5.1–5.4) is arranged in parallel and displaced simultaneously along a closed in itself displacement path. During parallel conveyance, conveying means (1) are loaded with objects (11), objects are unloaded from conveying means and/or objects (11) loaded on conveying means (1) are processed, buffered or intermediately stored.

13 Claims, 3 Drawing Sheets

METHOD FOR CONVEYING UNIT LOADS AND CONVEYOR SYSTEM FOR IMPLEMENTING SAID METHOD

BACKGROUND OF THE INVENTION

FIELD OF THE INVENTION

The invention is situated in the field of materials-handling technology and relates to a conveying method and to a conveying system for conveying piece goods including changeover between serial and parallel conveyance.

DESCRIPTION OF RELATED ART

In the following, piece goods shall be understood to be a large number of objects that are conveyed either individually or in small groups in defined positions and, if so required, are processed and/or buffered. The piece goods are identical or at least so similar to one another that they all are conveyed, held during conveyance, and processed using the same means.

Piece goods are conveyed to processing stations and, after being processed, are conveyed away from processing stations. Processing means for processing piece goods are either essentially stationary, so that the objects are stopped for being processed, or else move along with the conveyed objects such that processing during continuous conveyance is possible.

For increasing throughput of such piece goods processing, rows of identical processing means are installed for simultaneous processing a plurality of objects (processing parallel in time).

Such a row of processing means operated simultaneously can be arranged in parallel to a conveying track, on which conveying track the objects are conveyed in series, i.e., in essence individually one after the other. Operation of such an arrangement takes place in processing cycles, in each of which one group of objects is processed, and conveying cycles alternating with processing cycles, in which the objects processed in the preceding processing cycle are conveyed away from the processing area and objects to be processed are conveyed into the processing area. For processing using a row of processing means arranged in parallel to the conveying track, the objects are conveyed in series only. In such processing, the length of the processing cycles is dependent on the processing process, the length of the conveying cycles on the number of objects to be processed simultaneously. Parallel processing in connection with serial conveyance is, for example, customary, if the piece goods are conveyed by a conveyor chain equipped with equidistant holding means for holding the objects.

If objects to be processed temporally parallel are also conveyed in parallel (locally parallel), i.e., along different conveying tracks running substantially in parallel, the row of processing means operated parallel in time is arranged transverse to the conveying direction. In this case the conveying cycles alternating with the processing cycles become shorter in comparison with the method mentioned above and, accordingly, the throughput becomes correspondingly higher. However, a more elaborate conveying device has to be provided in addition to means for changing the conveying method (serial/parallel), if parallel conveyance is advantageous in specific zones only, in other zones serial conveyance being desirable. Such changing means are, for example, switch points for branching and for joining together conveying paths, with the help of which a serial stream of conveyed objects is split-up into parallel part streams or a plurality of parallel part streams is joined to form one serial conveying stream. For such conveying methods, conveyor chains with holding means can only be utilised, if the objects are correspondingly transferred at the switch points. More simply, the objects are conveyed by suitable guide means (e.g. conveyor belts) and are accurately positioned in processing stations, in most cases by being taken over by correspondingly designed holding means to be held in a predefined position for being processed.

The changeover between serial conveyance and parallel conveyance with the help of branching and joining switch points can be implemented also in conveying systems with rail-like guide means and with a plurality of conveying means being independent of one another, being equipped for conveying in held manner one object each or a small group of objects, and being individually movable along the rail-like guide means. In conveying systems of this kind, the products do not need to be transferred at switch points. However, elaborate switch points and parallel rail stretches, both using a lot of space are still needed for the changeover between serial and parallel conveyance.

Further known methods for changes between serial and parallel conveyance use holding means, each equipped for holding a row of objects and being conveyed with the held object row oriented either parallel to the conveying direction (serial conveyance) or substantially perpendicular to the conveying direction (parallel conveyance). Either, such holding means are mounted rotatably on suitable conveying means or different kinds of rails are provided for serial conveyance and for parallel conveyance (e.g. described in DE-19717352). Using such holding means, no great effort is needed for the change between parallel conveyance and serial conveyance. However, additional means are needed for picking single objects out of the rows for individual handling.

SUMMARY OF THE INVENTION

It is an object of the invention to create a method for conveying piece goods using a conveying system comprising rail-like guide means and conveying means being movable along the rail-like guide means independently of one another and being equipped for holding individual objects or small groups of objects. The method is adaptable for any desired changeover between serial and parallel conveyance. In particular, the method enables parallel conveyance with different numbers of objects being conveyed in parallel, reduces object transfers as far as possible and nonetheless is simple, utilisable as universally as possible and is applicable with as few and as simple as possible means. Furthermore, it is the object of the invention to create a conveying system for implementing the method.

In a conveying system with rail-like guide means and with conveying means being independently movable along the rail-like guide means, changeover from serial to parallel conveyance is implemented according to the inventive method by bringing a displaceable rail element into a first position, in which it is in connection with a further, essentially stationary rail element, by serially moving a plurality of conveying means from the stationary rail element to the displaceable rail element, by blocking the plurality of conveying means on the displaceable rail element, and by displacing the displaceable rail element together with the conveying means blocked on it essentially transverse to the conveying direction of the serial conveyance, i.e. in essence transverse to its length, which for the conveying means blocked on the rail element is equivalent to parallel conveyance.

For a change from such parallel conveyance back to serial conveyance, the displaceable rail element is brought (again essentially transverse to its length) into a position, in which it once again connects with an essentially stationary rail element, the conveying means are unblocked on the displaceable rail element and are serially conveyed away from the displaceable rail to the stationary rail element.

The conveying means, which according to the inventive method are conveyed partly serially and partly in parallel, are, for example, each equipped with a holding means for holding one object. During changeover from serial to parallel conveyance they carry objects to be processed. During parallel conveyance the objects are processed and the conveying means carry processed objects at the changeover from parallel to serial conveyance. Temporary changeover from serial conveyance to parallel conveyance according to the invention can also be utilised for parallel loading or unloading of conveying means or for buffering or intermediate storage of conveying means or objects respectively.

Important advantages of the conveying system according to the invention include the features that within the same conveying system different zones with parallel conveyance with different numbers of parallel conveying routes can be implemented and that the conveying means are completely independent of one another in zones with serial conveyance.

If the conveying means are blocked in predefined positions on the displaceable rail element, then the objects are maintained in defined positions for a processing operation during parallel conveyance and do not have to be transferred to holding elements of the processing station. A simple manner for blocking the conveying means on the displaceable rail element consists of conveying the maximum possible number of conveying means onto the rail element and closing-off both ends of the rail element. The blocked conveying means keep each other in defined positions along the displaceable rail element.

In a preferred embodiment of the invention, a plurality of identical displaceable rail elements are used for parallel conveyance. One after the other of these displaceable elements are brought into the first position, loaded with conveying means, and then displaced one behind the other and essentially transverse to the direction of serial conveyance. According to a further, advantageous embodiment of the invention, the displaceable rail elements are displaced along a closed in itself displacement path and the first position is the same as the second one, i.e., a position, in which on both sides of the displaceable rail element a stationary rail element is adjoining. In an embodiment of this type, a group of conveying means on a displaceable rail element is exchanged whereby the group positioned on the displaceable rail element is pushed off by a new group.

For the named, preferred embodiments of the invention it is particularly advantageous to use conveying systems with rails and conveying means designed such that conveyance along the rails is possible in every position of the conveying means relative to the rail. A conveying system of this kind and parts of it are described, for example, in the publications EP-0387318 (or U.S. Pat. No. 5,074,678), EP-0870934 or WO-98/23509 of the same applicant.

The conveying system for the implementation of the method in accordance with the invention comprises rail-like guide means and conveying means movable along the rail-like guide means independently of one another and equipped for held conveyance of individual objects or of small groups of objects, wherein at least one rail element is displaceable essentially transverse to its length into a position, in which it connects with an essentially stationary rail element, and out of this position. Advantageously, the conveying system comprises a plurality of displaceable rail elements, which are displaceable one after the other along a displacement path closed in itself, wherein in at least one of the displacement positions a stationary rail element joins with the displaceable rail element.

A means for the displacement of a plurality of rail elements on a closed in itself displacement path is, for example, a rail arrangement driven to rotate around a rotational axis, in which a plurality of displaceable rail elements is arranged parallel to the rotation axis and at equal spacings between each other. This rail arrangement is integrated in the conveying system such that its rotation axis is aligned parallel to the direction of serial conveyance.

BRIEF DESCRIPTION OF THE DRAWINGS

The inventive method for conveying piece goods and the conveying system for carrying out the method are described in more detail on the basis of the following Figures, wherein.

DETAILED DESCRIPTION OF THE PREFERRED EMBODIMENTS

Figure 1:
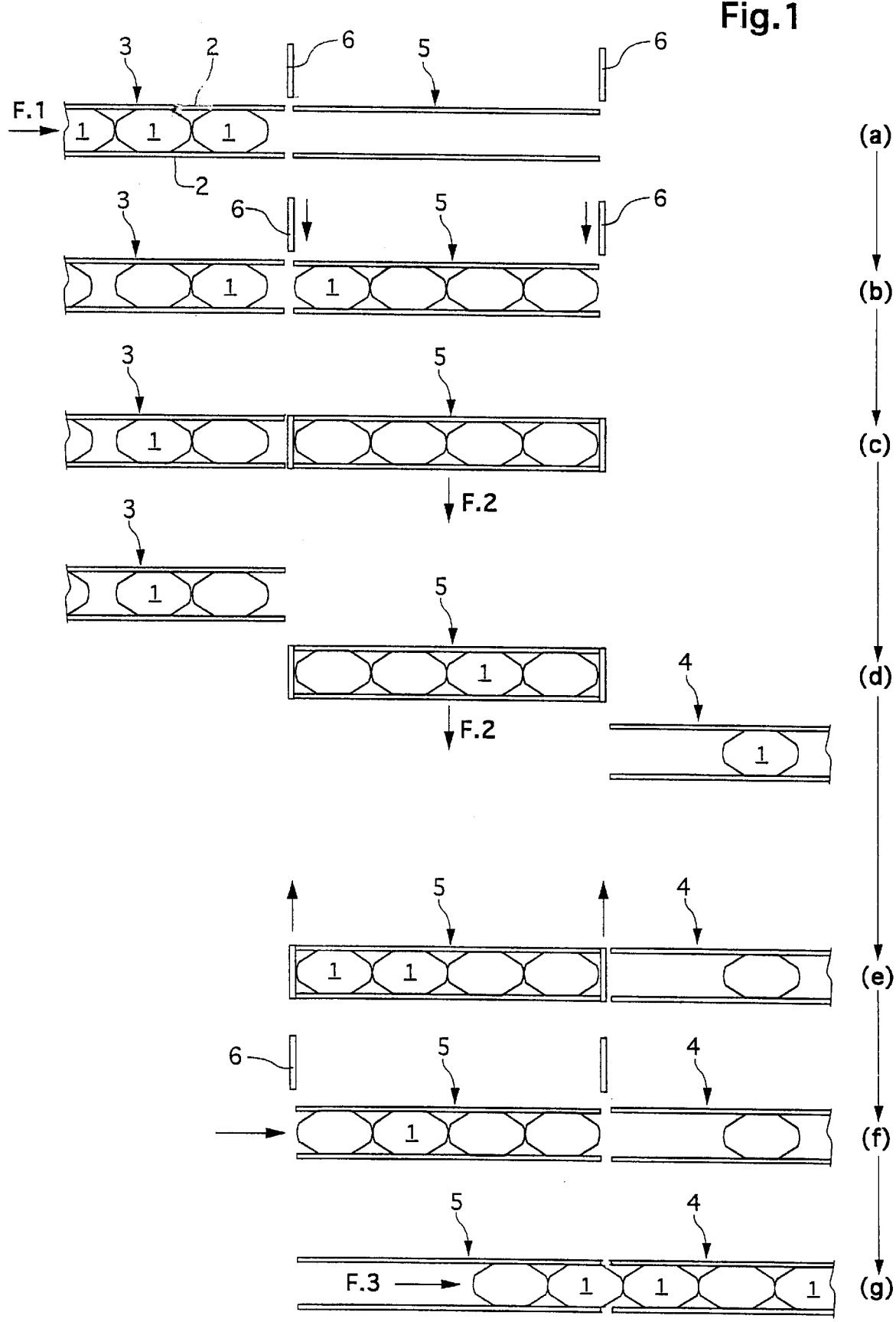
FIG. 1 is a general schematic diagram illustrating the sequential steps of the method in accordance with the invention.

FIG. 1 depicts in a very schematic manner consecutive phases (a) to (g) of a changeover from serial conveyance to parallel conveyance and a second changeover back to serial conveyance being carried out in accordance with the inventive method and using a conveying system with rails and with a plurality of conveying means movable along the rails independently of one another.

The conveying means 1 are schematically represented as simple bodies running in a pair of rails or in a conveying channel 2. It is not essential for the invention how the conveying means are guided and how they move along the guide means, and it is also not essential how the conveying means hold the objects to be conveyed.

FIG. 1 depicts two essentially stationary rail elements 3 and 4, through which directions F.1 and F.3 of serial conveyance are defined, and a rail element 5 displaceable substantially transverse to the conveying directions F.1 and F.3 (displacement direction F.2 or direction of parallel conveyance). FIG. 1 furthermore illustrates blocking means in the form of a pair of rail end pieces 6, which are adapted to be brought into an open position and a closed position relative to the displaceable rail element and are displaceable together with the displaceable rail element in the displacement direction F.2.

In phase (a) the displaceable rail element 5 is in a first position, in which it at least on its one side connects with a stationary rail element 3. In this first position, conveying means 1 are conveyed serially (conveying direction F.1) along the stationary rail element 3 onto the displaceable rail element 5, for example, until the displaceable rail element 5 is full (phase (b)). Thereupon, the conveying means 1 positioned on the displaceable rail element 5 are blocked, for example, by closing-off both ends of the rail element with the help of the rail end pieces 6 (phase (c)) and the displaceable rail element 5 is displaced from the first position (phase (d)) in the direction F.2 at least during a first phase essentially transverse to the direction F.1 of serial conveyance. At least during a last phase of parallel conveyance, the displaceable rail element 5 once again in the displacement direction F.2 is moved to a second position, in which it once again, albeit with its other end, connects with an essentially stationary rail element 4 (phase (e)). The conveying means positioned on the displaceable rail element 5 are unblocked by bringing the rail end pieces 6 into their open position (phase (f)) and the conveying means 1 positioned on the displaceable rail element 5 are conveyed away in series from the displaceable rail element 5 in the direction F.3 of serial conveyance (phase (g)).

As already intimated above, it is conceivable, that the displaceable rail element 5 between its displacement from the first position and its displacement into the second position, both of which displacements are in essence oriented transverse to the conveying directions F.1 and F.3 (transverse to the length of the displaceable rail element 5), is displaced in different directions, for example, also parallel to F.1 or F.3. It is also not a condition that the direction of serial conveyance in the first position (F.1) is the same as or parallel to the direction of the serial conveyance (F.3) in the second position (F.3). In preferred embodiments of the method according to the invention, however, the greatest part of the displacement of the displaceable rail element will run essentially perpendicular to F.1/F.3 and the two stationary rail elements 3 and 4 and with this the two conveying directions F.1 and F.3 will be parallel to one another or on the same line. A plurality of displaceable rail elements can be conveyed simultaneously along the displacement path with the same or different distances between them either continuously or in cycles or being at a standstill from time to time (for example, for being buffered or intermediately stored).

Figure 2:
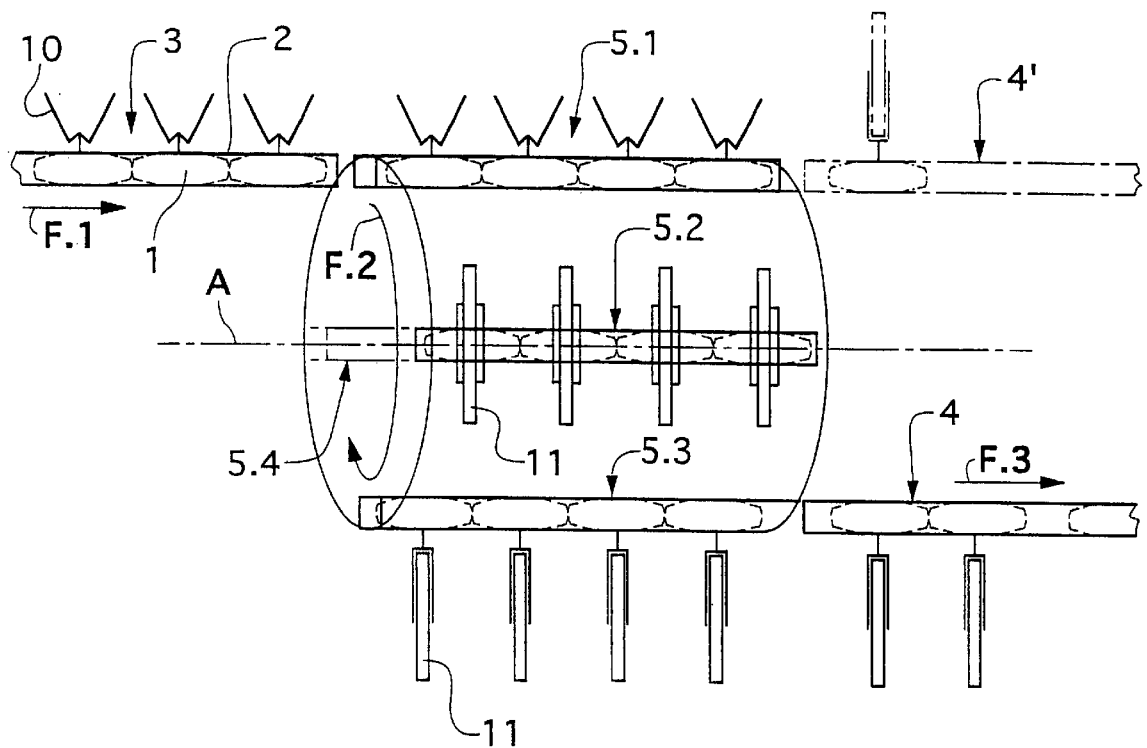
FIG. 2 is a schematic depiction of an exemplary embodiment of the conveying system according to the invention comprising four parallel, displaceable rail elements displaceable along a circular displacement path (viewing direction perpendicular to the direction of serial conveyance)

FIG. 2 illustrates the one part of an exemplary embodiment of the conveying system in accordance with the invention, which serves for a change from serial conveyance (conveying direction F.1) to parallel conveyance (displacement direction F.2) and back to serial conveyance (conveying direction F.3 or F.1). Conveying means 1 are supplied serially along a stationary rail element 3 and are conveyed in parallel (displacement direction F.2) through the displacement of four displaceable rail elements 5.1 to 5.4, to be finally conveyed away in series (conveying direction F.3 or once again F.1) along a further, stationary rail element 4 (or 4').

The conveying means 1 displaceable along the rails are once again represented as bodies movable in a pair of rails or in a conveying channel 2. They are equipped with holding means 10 distanced from the rails and serving for gripping and holding objects 11. Parallel conveyance serves in the shown exemplary application for parallel loading objects 11 on conveying means blocked on one of the displaceable rail elements (5.1 to 5.4).

The four displaceable rail elements 5.1 to 5.4 are arranged parallel to one another and at an equal spacing between one another along a circular displacement path such that the position of a rail element following a displacement step is taken over by a following rail element. The displacement path runs on a cylindrical envelope, the rotational axis of which is aligned parallel to the conveying directions F.1 and F.3.

The first position of the displaceable rail elements 5.1 to 5.4 in FIG. 2 is located on top. Conveying means 1 with empty holding means 10 are loaded onto displaceable rail elements 5.1 to 5.4 positioned in this first position. By displacing the displaceable rail elements (rotation by, for example, 90°) the loaded, displaceable rail element is brought into a third position, in which the holding means 10 of the blocked conveying means 1 are loaded with objects 1. Simultaneously, a further, displaceable rail element is brought into the first position. From the third position, the rail element full of loaded conveying means is brought into the second position, in which it connects with a further, stationary rail element 4. The loaded conveying means are unblocked and are serially conveyed onto the rail element 4.

As represented in FIG. 2 with a dot-dash line, it is also possible that the first and the second position and the two conveying directions F.1 and F.3 are identical. Therefore, both ends of a displaceable rail element 5.1 to 5.4 positioned in this position connect with a stationary rail element 3 and 4' and the loaded conveying means 1 are conveyed onto the stationary rail element 4' by being pushed by empty conveying means from the displaceable rail element to the stationary rail element 3.

It goes without saying that the conveying system illustrated in FIG. 2 is not only utilisable for parallel loading of conveying means as shown in FIG. 2, but in the same manner also for parallel processing of objects in at least one third position. It is also possible to carry out loading, processing and/or unloading of objects in consecutive third positions, all during the same, parallel conveyance.

Figure 3:
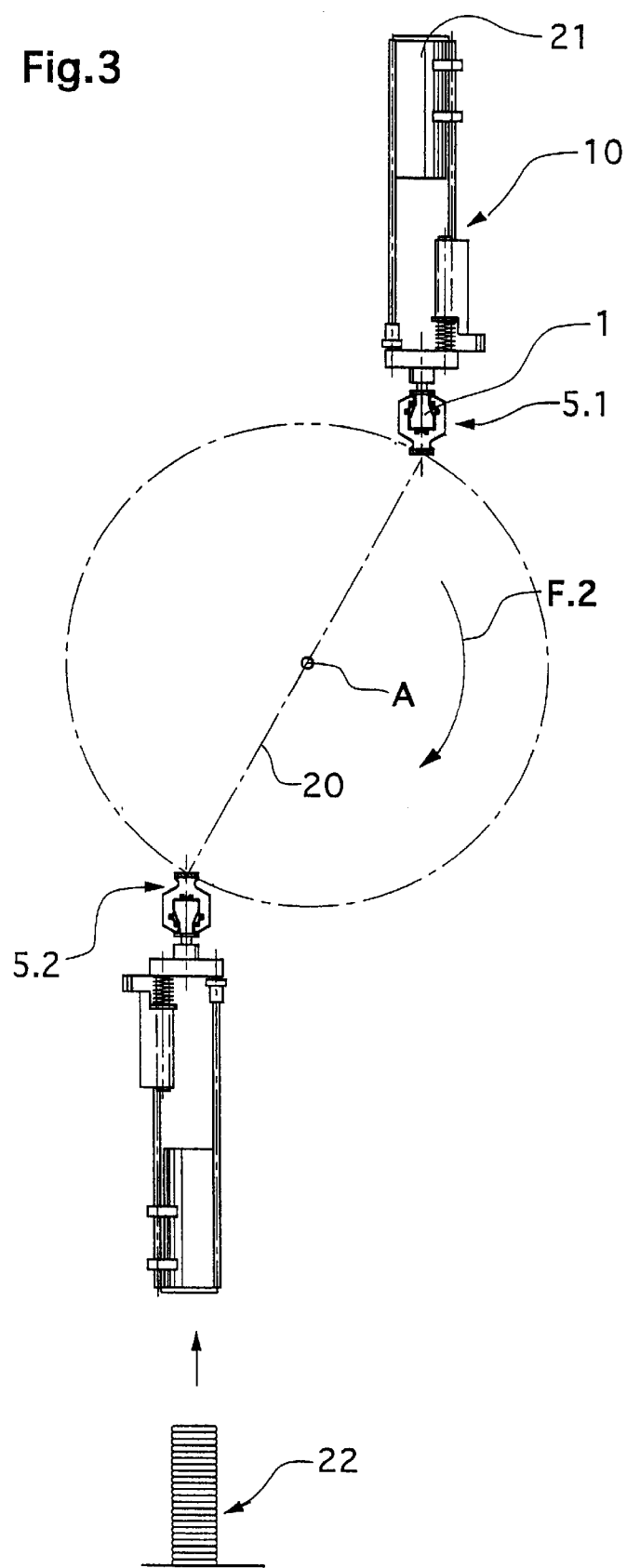
FIG. 3 is a schematic illustration of a further exemplary embodiment of the conveying system in accordance with the invention comprising two parallel rail elements displaceable along a circular displacement path (viewing direction parallel to the direction of serial conveyance)

FIG. 3 shows a further, exemplary embodiment of the conveying system in accordance with the invention (viewing direction parallel to the direction of serial conveyance). The shown part of the system is again the one part serving for the changeover from serial to parallel conveyance and back to serial conveyance. The displaceable rail elements 5.1 and 5.2, like the rail elements 5.1 to 5.4 of FIG. 2, are arranged to be displaceable around a rotational axis A along a circular displacement path. The rail elements are arranged on centrally rotatably supported rotating levers 20.

The conveying means 1 once again are equipped with holding means 10, which holding means 10 are designed for holding cylindrical containers 21. The conveying means are e.g. serially supplied to the upper position (first and second position) and conveyed away from this position. The containers are filled in the lower position (third position) by pushing stacks 22 of articles (e.g. biscuits) into the containers, which are open at the bottom, and by closing the containers with corresponding lids.

Figure 4:
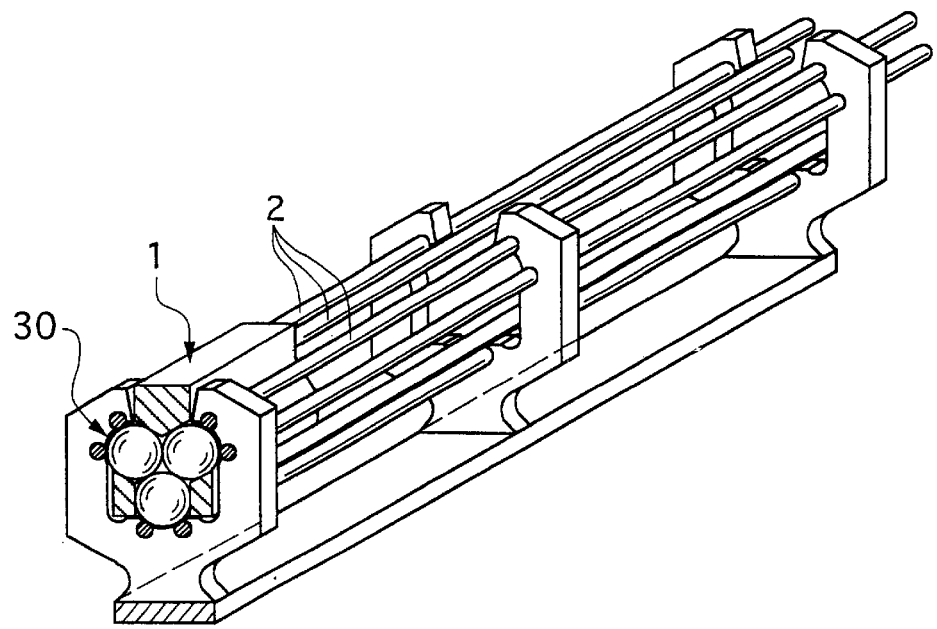
FIG. 4 shows an example of rails and conveying means for the conveying system according to the invention.

FIG. 4 illustrates an exemplary embodiment of rails 2 and conveying means 1 for a conveying system according to the invention. Each conveying means 1 comprises at least one group 30 of three balls, which run on six parallel rails 2 arranged in a cage-like manner. The conveying means 1 protrude out of the cage between two of the rails and, at this point, carry holding means (not shown), which are designed for a specific application. The illustrated rails 2 and conveying means 1 are in particular suitable for the method in accordance with the invention, because they allow conveyance of the conveying means 1 in different positions relative to the rails 2 and because they allow design of displaceable rail elements and transition between displaceable rail elements and stationary rail elements in a very simple manner. This conveying system and parts of it are described in the publications of the same applicant, which have already been quoted further above.

In the above description of the method according to the invention and of the conveying system according to the invention, no design details are included. These details are very much dependent on the characteristics of the rails and of the conveying means utilised and one skilled in the art knowing the invention as above specified will have no problem on implementing the conveying system in accordance with the invention.

What is claimed is:

1. A method for changing-over between serial conveyance and parallel conveyance in a conveying system comprising rail-like guide means (2) and a plurality of conveying means (1) independently movable along the guide means (2) and equipped for holding objects (11), wherein, for a changeover from serial to parallel conveyance, a displaceable rail element (5, 5.1–5.4) is brought into a first position, in which the displaceable rail element (5, 5.1–5.4) connects with an essentially stationary rail element (3), a maximum possible number of conveying means (1) is conveyed in series along the stationary rail element (3) onto the displaceable rail element (5, 5.1–5.4) and is blocked in a defined position on the displaceable rail element (5, 5.1–5.4) and the displaceable rail element (5, 5.1–5.2), with the conveying means (1) blocked on it, is displaced in essence transverse to its length, and wherein the displaceable rail element (5, 5.1–5.4) is positioned in at least one second position in which the conveying means (1) are loaded with objects, objects held by conveying means are processed and/or objects are unloaded from conveying elements, and wherein, for a changeover from parallel to serial conveyance, the displaceable rail element (5, 5.1–5.4) is displaced essentially transverse to its length into a third position, in which it connects with a further essentially stationary rail element (4), the conveying means (1) are unblocked on the displaceable rail element (5, 5.1–5.4) and are conveyed in series off the displaceable rail element (5, 5.1–5.4) to the further rail element (4).

2. The method according to claim 1, wherein the conveying means (1) are conveyed onto the displaceable rail element (5, 5.1–5.4) and off the displaceable rail element (5, 5.1–5.4) in the same conveying direction (F.1).

3. The method in accordance with claim 1, wherein the conveying means (1) convey in a held manner containers (21) that are filled and closed in a third position.

4. The method according to claim 1, wherein the first position and the third position of the displaceable rail element (5) or of the displaceable rail elements (5.1–5.4) are identical and the displaceable rail element or the displaceable rail elements are displaced along a closed in itself displacement path.

5. The method according to claim 4, wherein on the closed in itself displacement path a number of displaceable rail elements (5.1–5.4) are displaced essentially one behind the other, wherein said number corresponds to the number of first, second and third positions.

6. The method according to claim 1, wherein a plurality of displaceable rail elements (5.1–5.4) arranged substantially in parallel are provided and wherein, during the displacement of one of the displaceable rail elements from the first position to the second position, a further displaceable rail element is displaced from the second into the third position and an even further displaceable rail element is displaced from the third position into the first position.

7. The method according to claim 6, wherein, between being positioned in the first position and in the third position, the displaceable rail elements are arranged essentially one behind the other with the same or with a different spacing between one another and are conveyed continuously or in cycles or with intermittent stand-stills.

8. A conveying system comprising rail-like guide means (2) and a plurality of conveying means (1) movable independently of one another along the rail-like guide means (2) and equipped with means for holding objects (11), wherein, for changing over from serial to parallel conveyance and vice versa, the conveying system further comprises a displaceable rail element (5, 5.1–5.4) being equipped with blocking means (6) such that a maximum number of conveying means (1) can be blocked in defined positions on the displaceable rail element (5, 5.1–5.4) and being displaceable together with the conveying elements (1) blocked on it essentially transverse to its length into a first, at least one second and a third position, wherein in the first and in the second position, the displaceable rail element connects with an essentially stationary rail element (3, 4), and wherein in the at least one second position, means for loading conveying elements (1) with objects (11), means for unloading objects (11) from conveying means (1) and/or means for processing objects held by conveying means are provided.

9. The conveying system according to claim 8, wherein the rail-like guide means (2) comprise six parallel rails in a cage-like arrangement and wherein each conveying means (1) comprises at least one group (30) of three balls, wherein the groups (30) of three balls are arranged such that during conveyance each one of the three balls rolls along two neighboring rails.

10. The conveying system in accordance with claim 8, wherein a plurality of displaceable rail elements (5.1–5.4) arranged parallel to one another and being simultaneously displaceable are provided.

11. The conveying system according to claim 10, wherein the displaceable rail elements (5.1–5.4) are displaceable along a closed in itself displacement path.

12. The conveying system in accordance with claim 11, wherein the closed in itself displacement path defines a position, in which a displaceable rail element (5.1–5.4) connects on both sides with an essentially stationary rail element (3, 4').

13. The conveying system according to claim 12, wherein the displaceable rail elements (5.1–5.4) are rotatably driven around a rotation axis (A), from which rotation axis (A) the displaceable rail elements all have the same distance and to which rotation axis (A) the displaceable rail elements are arranged in parallel.

* * * * *